United States Patent
Ogura

(10) Patent No.: US 6,980,593 B2
(45) Date of Patent: Dec. 27, 2005

(54) WIRELESS TRANSMISSION-RECEPTION SYSTEM

(75) Inventor: Hideshige Ogura, Yokohama (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 630 days.

(21) Appl. No.: 10/077,303

(22) Filed: Feb. 15, 2002

(65) Prior Publication Data

US 2002/0114387 A1    Aug. 22, 2002

(30) Foreign Application Priority Data

Feb. 19, 2001    (JP)    .............................. 2001-041383

(51) Int. Cl.[7] .......................... H04B 1/66; H04L 27/04; H04L 27/06
(52) U.S. Cl. ...................... 375/240; 375/295; 375/316; 375/345; 455/43
(58) Field of Search ................................ 375/240, 345, 375/271, 295, 302, 316, 322; 455/39, 42, 455/43

(56) References Cited

U.S. PATENT DOCUMENTS

| | | | |
|---|---|---|---|
| 2,220,260 A * | 11/1940 | Heinrich | ..................... 455/308 |
| 4,215,431 A * | 7/1980 | Nady | .......................... 455/43 |
| 5,091,952 A * | 2/1992 | Williamson et al. | ........ 381/318 |
| 5,226,178 A * | 7/1993 | Eastmond et al. | ............ 455/23 |
| 6,038,430 A * | 3/2000 | Thomson et al. | ............. 455/72 |

* cited by examiner

*Primary Examiner*—Tesfaldet Bocure
*Assistant Examiner*—Naheed Ejaz
(74) *Attorney, Agent, or Firm*—Welsh & Katz, Ltd.

(57) ABSTRACT

The wireless transmission-reception system of the subject invention includes a transmitter and a receiver. The transmitter includes a compressor for compressing a signal to be transmitted and a pre-emphasis circuit for emphasizing an output signal of the compressor. The receiver includes a demodulator, an expander circuit for expanding an output signal of the demodulator, a first de-emphasis circuit connected to the demodulator in parallel with the expander for de-emphasizing the output signal of the demodulator, and a second de-emphasis circuit connected to an output signal of the expander circuit for de-emphasizing a signal expanded by the expander circuit. The expander circuit having a variable gain amplifier includes a rectifier. An output signal from the first de-emphasis circuit is sent to the rectifier and an output signal of the rectifier performs to control a gain of the variable gain amplifier.

4 Claims, 1 Drawing Sheet

WIRELESS TRANSMISSION-RECEPTION SYSTEM

FIELD OF THE INVENTION

The present invention relates to a compression-expansion communication type wireless transmission-reception system, and particularly to a receiver which gives effect to de-emphasis.

BACKGROUND OF THE INVENTION

The compression-expansion process is a technique, which is mostly utilized for wireless microphones and so on, wherein a transmitter has a compressor circuit (compressor) for compressing signal(s) to be transmitted in a level, while a receiver has an expander for expanding the compressed, transmitted signal level to the original signal level, for purposes of suppression in noises or leaked speeches.

Most of the wireless microphones obtain improvement in the S/N ratio by, for example, the emphasized signals as known. The emphasis has a pre-emphasis process where the transmitter transmits signal(s), while performing expansion of gain in the high frequency range so as to suppress the generated noises. Since the generated noises depend on higher modulation frequencies of the transmitted signals, the emphasis process has a de-emphasis process in which the receiver performs reduction in the gain of the transmitted signal(s) so that the received signal(s) become the original signal(s).

Most of the noise and leaked speech reducing processes between the transmitter and receiver are performed in a combination of the compression-expansion technique and the emphasis technique. In such the wireless microphone, the compression-expansion technique and the emphasis process are performed in two orders (described below) for tuning of the mutual frequencies having the changes.

Figure 2A:
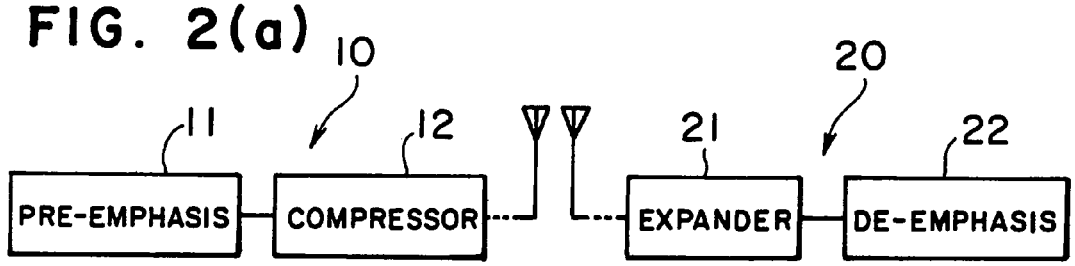
Figure 2B:
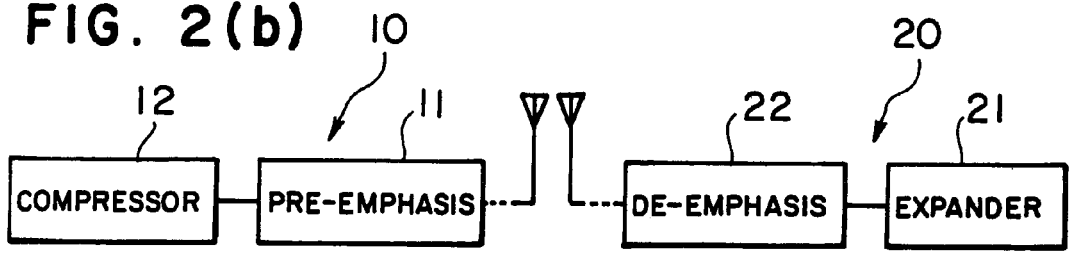

In the first process of noise and leaked speech reduction (as shown in FIG. 2 (*a*)), the pre-emphasis of transmission signal(s) by a pre-emphasis circuit of the transmitter 10, and the de-emphasis of the reception signal(s) by a de-emphasis circuit of the receiver 20 are performed before the transmitted signal(s) being compressed through a compressor circuit 12, and after the received signal(s) being expanded through an expander circuit 21, respectively.

On the other hand, in the second process of noise and leaked speech reduction (as shown in FIG. 2 (*b*)), the pre-emphasis of the transmitted signal(s) by a pre-emphasis circuit of the transmitter 10, and the de-emphasis of the reception signals by a de-emphasis circuit of the receiver 20 are performed after the transmitted signals being compressed through a compressor circuit 12, and before the received signals being expanded through an expander circuit 21, respectively.

The foregoing first process has some problems. The input of the signal(s) into the compressor circuit 12 after expansion of the gain in high frequencies by the pre-emphasis circuit causes distortion or skewness of the sound(s) in high frequencies. In order to reduce the skewness of the sound(s) in high frequencies, the reduction in the signal level (compressibility) adversely affects the S/N ratio in low frequencies. For improvement in such the S/N ratio, when the transmitter runs with a battery, the consumed battery must be considered.

In the foregoing second process where the signals are pre-emphasized after compressed, the transmitter has no production of the distorted or skewed sound in high frequencies as given in the foregoing first process. However, the performance of the expansion of the received signals by the receiver will be limited. Hence, even though the received signals are de-emphasized by the de-emphasis circuit of the receiver before expanded by the expander circuit, such the de-emphasis circuit does not have efficiency of the noise reduction in the signals outputted from the expander circuit.

SUMMARY OF THE INVENTION

In order to solve the forgoing problems, the present invention involves an improvement of a wireless transmission-reception system having a transmitter which has a compressor circuit and a pre-emphasis circuit, and a receiver which has an expander circuit and a de-emphasis circuit it provides a receiver having improvements in the designed construction in its circuit.

In the wireless transmission-reception system according to the present invention, the transmitter has a compressor circuit for compressing signal(s) to be transmitted, and a pre-emphasis circuit connected to the compressor circuit for performing emphasis of the compressed signal(s) in the predetermined frequency range, in the substantially same construction as described above in connection with the second process. The receiver comprises an expander circuit for performing expansion of the received signal(s), the expander circuit having a variable gain amplifier; a first de-emphasis circuit connected to the demodulation means in parallel with the expander circuit for performing de-emphasis of the received signal(s) which are not subjected to expansion by the expander circuit yet; and a second de-emphasis circuit connected to the expander circuit for performing de-emphasis of the signals being received and expanded by the expander circuit. The output signals from the first de-emphasis circuit effects control of the gain of the variable gain amplifier.

Preferably, a combination or each of the first and second de-emphasis circuits has complementary de-emphasis to the forgoing pre-emphasis circuit. In addition, in embodiment according to the present invention, the receiver has a rectifier circuit connected to the forgoing first de-emphasis circuit for performing gain control of the variable gain amplifier.

BRIEF DESCRIPTION OF THE INVENTION

Figure 1:
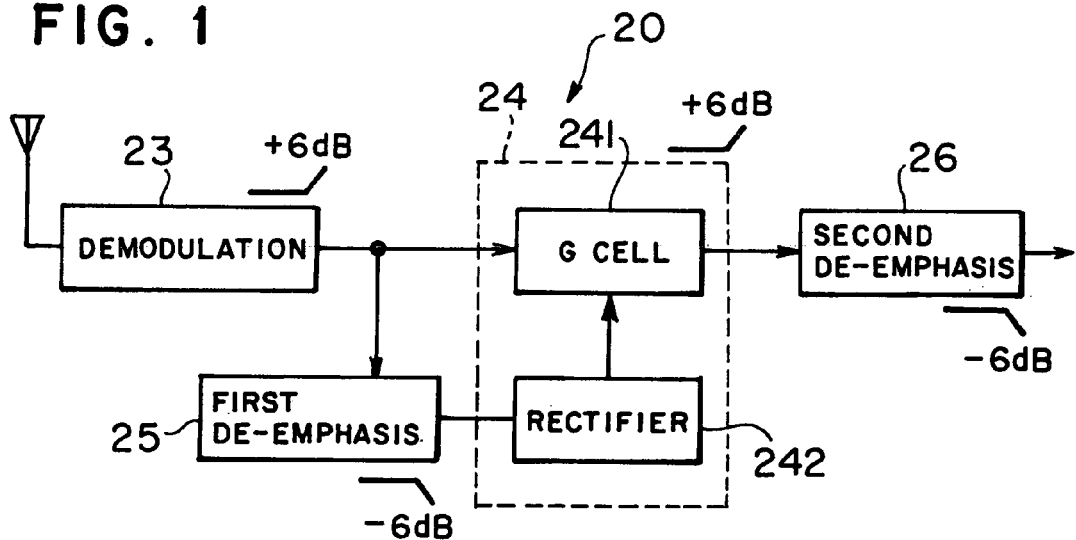

FIG. 1 is a block view showing an embodiment of a receiver of a wireless transmission-reception system according to the present invention; and FIGS. 2(*a*) and (*b*) are schematic views depicting conventional two types of respective combinations of compressor and expander circuits in the wireless transmission and reception system.

PREFERRED EMBODIMENTS Of THE INVENTION

Referring to FIG. 1, a receiver according to the present invention is shown. The receiver receives signal(s) from the foregoing transmitter in which the pre-emphasis of the compressed signal(s) to be transmitted is performed as shown in FIG. 2 (*b*). Thus, the present invention provides improvement in the foregoing receiver 20.

The receiver according to the present invention has two de-emphasis circuits 25, 26. The received signals are input ted into the expander circuit 24 through a first step (demodulation) circuit 23. The expander circuit 24 has a variable gain amplifier (G cell) 241 through which the received signals are amplified to a predetermined level. The expander circuit 24 also has a rectifier circuit 242 connected to gain control terminals of the variable gain amplifier 241.

To the first step (demodulation) circuit 21, the first de-emphasis circuit 25 is connected in parallel with the expander circuit 24. Thus, the received signals from the output of the first step circuit 21 are subjected to de-emphasis through the first de-emphasis circuit 25. The de-emphasized signal(s) from the first de-emphasis circuit 25 are inputted into the expander circuit 24. In the expander circuit 24, the rectifier circuit 242 performs rectification of the inputted, de-emphasized signals from the de-emphasis circuit 25 for control of gain for the variable gain amplifier 241.

From the expander circuit 24, the expanded, received signals form the first step circuit are outputted. Secondly, the second de-emphasis circuit 26 de-emphasizes the outputted, expanded signal(s) that they have not been de-emphasized by the first de-emphasis circuit 25 yet. According to this embodiment, a combination or each of such the first and second de-emphasis circuits 25, 26 has a complementary de-emphasis to the pre-emphasis circuit (See FIG. 2 (b) ) of the receiver 10.

For example, when the transmitter 10 transmits signal(s) where the gain in high frequencies is emphasized to +6 dB through the pre-emphasis circuit 11, the foregoing first de-emphasis circuit 25 de-emphasizes the received signal(s) from the first step circuit 21 in high frequencies to −6 dB.

Thus, the first de-emphasis circuit 25 outputs the received signal having 0 dB gain in high frequencies. Such the received signal(s) are rectified thorough the rectifying circuit 242, and then the variable gain amplifier 241 obtains from the rectifying circuit 242 the rectified signal(s) as a gain control signal.

Accordingly, after the received signal(s) are outputted from the first step circuit 23, they pass the variable gain amplifier 241, while maintaining the gain in high frequencies with emphasis in +6 dB. The second de-emphasis circuit 26 de-emphasizes the received signal(s) in −6 dB on the gain in high frequencies.

Hence, a combination of the expansion of the received signals with emphasis in the high frequency range, and thereafter de-emphasis of the expanded signal(s) in the high frequency range contributes to reduction in noise in high frequency range in both the expander circuit 24 and the second de-emphasis circuit 26. This increases the effect of noise reduction.

As an example, the wireless microphone according to FIG. 2 (b) type had the noise level of −102.8 dBV. However, the a wireless microphone according to the present invention accomplished the improvement where the noise level decreased to −105.0 dBV, −105.6 dBV, and −106.3 dBV, at the add-on de-emphasis of 22 µs, 50 µs, and 122 µs are performed, respectively.

As described above, according to the present invention, the transmitter performs emphasis (pre-emphasis) of the compressed signal(s) for transmission to reduce skews produced therein, while the receiver performs expansion of the received, emphasized signal(s) and then de-emphasis of the expanded, received signal(s). This increases the effect of noise reduction.

What is claimed is:

1. A wireless transmission reception including a transmitter and a receiver, the transmitter including a compressor for compressing a transmit signal and a pre-emphasis circuit for emphasizing an output signal of the compressor at high frequencies, the receiver including demodulation means, a first de-emphasis circuit, a expander circuit and a second de-emphasis circuit, the expander circuit having a variable gain amplifier, the expander circuit connected to an output of the demodulation means, the first de-emphasis circuit connected to the output of the demodulation means and de-emphasizing the output signal of the demodulation means in high frequencies, the second de-emphasis circuit connected to an output of the expander circuit and de-emphasizing the output signal of the expander at high frequencies, the wireless-transmission reception system comprising:
the pre-emphasis circuit in the transmitter emphasizing an output signal of the compressor in +6 dB in both the gain and the high frequencies;
the first de-emphasis circuit disposed in the receiver and connected to the output of the demodulator in parallel with the expander circuit, an output of the first de-emphasis circuit connected to the rectifier circuit, the first de-emphasis circuit de-emphasizing the output signal of the demodulation means in −6 dB in both the gain and the high frequencies; and
the second de-emphasis circuit de-emphasizing the output signal of the expander circuit in −6 dB in both the gain and the high frequencies;
the output signal of the first de-emphasis circuit controlling a gain of the variable gain amplifier.

2. The wireless transmission-reception system according to claim 1, wherein a combination or each of the first and the second de-emphasis circuits in the receiver has a complementary de-emphasis to the pre-emphasis circuit in the transmitter.

3. The wireless transmission-reception system according to claim 1, wherein the expander circuit further includes a rectifier circuit for rectifying the output signal of the first de-emphasis circuit, the gain of the variable gain amplifier controlled by the output signal of the rectifier circuit.

4. The wireless transmission-reception system according to claim 2, wherein the expander circuit further includes a rectifier circuit for rectifying the output signal of the first de-emphasis circuit, the gain of the variable gain amplifier controlled by the output signal of the rectifier circuit.

* * * * *